United States Patent
Atschreiter et al.

(10) Patent No.: US 9,879,794 B2
(45) Date of Patent: Jan. 30, 2018

(54) VALVE WITH FAIL-SAFE MECHANISM

(71) Applicant: Magna Powertrain GmbH & Co KG, Lannach (AT)

(72) Inventors: Friedrich Atschreiter, Allhartsberg (AT); Hannes Hofstetter, Waidhofen a.d. Thaya (AT); Markus Oberladstätter, Innsbruck (AT); Andreas Auinger, Pichi bei Wels (AT); Gerd Schlager, Kefermarkt (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 73 days.

(21) Appl. No.: 14/900,648

(22) PCT Filed: Jun. 25, 2014

(86) PCT No.: PCT/EP2014/063427
§ 371 (c)(1),
(2) Date: Dec. 22, 2015

(87) PCT Pub. No.: WO2014/207055
PCT Pub. Date: Dec. 31, 2014

(65) Prior Publication Data
US 2016/0153573 A1 Jun. 2, 2016

(30) Foreign Application Priority Data

Jun. 25, 2013 (DE) .................... 10 2013 212 044 U
Mar. 11, 2014 (DE) .................... 10 2014 204 485 U

(51) Int. Cl.
*F16K 17/00* (2006.01)
*F16K 17/38* (2006.01)
(Continued)

(52) U.S. Cl.
CPC .......... *F16K 17/386* (2013.01); *F16K 11/085* (2013.01); *F16K 31/003* (2013.01); *F16K 31/055* (2013.01); *F01P 2031/32* (2013.01)

(58) Field of Classification Search
CPC .... F16K 11/085; F16K 17/386; F16K 31/003; F16K 31/055; F01P 2031/32
(Continued)

(56) References Cited

U.S. PATENT DOCUMENTS 1,742,213 A * 1/1930 Murray ................. F16K 17/386
137/384
1,960,973 A * 5/1934 Knight ..................... F23N 5/02
137/65

(Continued)

FOREIGN PATENT DOCUMENTS

| CN | 1239119 A | 12/1999 |
|---|---|---|
| CN | 1263582 A | 8/2000 |

(Continued)

OTHER PUBLICATIONS

Search Report dated Jan. 11, 2017 in corresponding Chinese patent application Serial No. 2014800365526.
(Continued)

*Primary Examiner* — Umashankar Venkatesan
(74) *Attorney, Agent, or Firm* — Dickinson Wright PLLC

(57) ABSTRACT

A valve for use in a coolant flow. The valve comprises a valve housing with an inlet and at least one outlet, a valve body which is rotatably received by the valve housing, an actuator for rotating the valve body, and a fail-safe mechanism which can be pretensioned rotationally. The valve body is in rotational engagement with an axially moveable coupling element, via which the valve body is releasably connected indirectly to the actuator shaft. In the event of a fault, the valve body can be decoupled from the actuator (Continued)

shaft by an axial movement of the coupling element. The axial movement of the coupling element also causes the fail-safe mechanism to come into rotational engagement with the coupling element in order to rotate the valve body to a predefined fail-safe position.

19 Claims, 2 Drawing Sheets

(51) Int. Cl.
*F16K 11/085* (2006.01)
*F16K 31/00* (2006.01)
*F16K 31/05* (2006.01)

(58) Field of Classification Search
USPC .......................................................... 137/457
See application file for complete search history.

(56) References Cited

U.S. PATENT DOCUMENTS

| | | | |
|---|---|---|---|
| 3,687,415 A * | 8/1972 | Turkot | F16K 31/055 251/129.03 |
| 3,782,681 A * | 1/1974 | Blackstein | F16K 5/04 137/457 |
| 5,111,775 A * | 5/1992 | Sumida | F01P 7/16 123/41.1 |
| 5,791,557 A * | 8/1998 | Kunze | G05D 23/022 236/34.5 |
| 5,979,373 A | 11/1999 | Sano | |
| 6,470,906 B1 * | 10/2002 | Shieh | E03C 1/041 137/100 |
| 6,539,899 B1 * | 4/2003 | Piccirilli | F01P 7/167 123/41.08 |
| 6,681,805 B2 * | 1/2004 | McLane | B60H 1/00485 137/625.16 |
| 6,688,333 B2 * | 2/2004 | McLane | B60H 1/00485 123/41.1 |
| 6,745,995 B2 * | 6/2004 | Hu | F01P 7/167 123/41.08 |
| 7,082,903 B2 * | 8/2006 | Hutchins | F01P 7/16 123/41.05 |
| 7,721,973 B2 * | 5/2010 | Peric | F01P 7/14 137/625.49 |
| 8,690,072 B2 * | 4/2014 | Peric | F01P 7/14 236/34.5 |
| 2003/0098077 A1 | 5/2003 | McLane et al. | |
| 2012/0291899 A1 * | 11/2012 | Suzuki | B41F 31/08 137/625.15 |
| 2016/0273671 A1 * | 9/2016 | Chang | F01P 7/14 |

FOREIGN PATENT DOCUMENTS

| | | |
|---|---|---|
| CN | 102138032 A | 7/2011 |
| DE | 102012208652 B3 | 9/2013 |
| WO | WO03/042517 A1 | 5/2003 |

OTHER PUBLICATIONS

International Search Report dated Oct. 1, 2014 in International PCT Application Serial No. PCT/EP2014/063427.

* cited by examiner

VALVE WITH FAIL-SAFE MECHANISM

CROSS-REFERENCE TO RELATED APPLICATIONS

This application is a National Stage of International Application No. PCT/EP2014/063427, filed Jun. 25, 2014, which claims the benefit and priority of German Patent Application No. DE 10 2014 212 044.3, filed Jun. 25, 2013 and German Patent Application No. DE 10 2014 204 485.5 filed Mar. 11, 2014. The entire disclosures of each of the above applications are incorporated herein by reference.

FIELD

The present invention concerns a valve for use in a coolant flow.

BACKGROUND

This section provides background information related to the present disclosure which is not necessarily prior art.

Such valves may be used to control the coolant flow of an internal combustion engine in order to guarantee an optimum coolant temperature in the fluid circuit according to load. In the event of a fault, such as for example a defective control of the valve, failure of the valve actuator or sticking of the valve, however an undesirable temperature rise of the coolant can occur and hence critical states which could damage the internal combustion engine. In order to prevent such faults in which the coolant temperature rises undesirably above a predefined temperature, the valve described in DE 10 2012 208 652 B3 has a fail-safe mechanism which, in the event of a fault, causes the valve body to move to a predefined position in which the coolant flow through the valve is maximal in order to counter overheating states in the coolant circuit. Such a fail-safe mechanism may also be called a reset device in the present case.

Since, in the valve described in DE 10 2012 208 652 B3, the valve body is fixedly connected to the positioning actuator, only actuators which are not self-locking may be used, since the self-locking would adversely affect the correct function of the fail-safe mechanism. Otherwise the fail-safe mechanism would have to be able to apply return moments which are sufficient to overcome the self-locking of the actuator, for which the torsion spring of the fail-safe mechanism would have to be configured correspondingly stiff and therefore relatively large. Even in the case of non-self-locking positioning actuators, the fail-safe mechanism of DE 10 2012 208 652 B3 or its torsion spring would however always have to work against the resistance or inertia moment of the actuator, for which the torsion spring must be designed correspondingly stiff and hence comparatively large.

SUMMARY

This section provides a general summary of the inventive concepts associated with the present disclosure and is not intended to represent a comprehensive disclosure of its full scope or all of its features, objects and aspects.

The present invention is therefore based amongst others on the object of refining valves with fail-safe mechanisms so that self-locking actuators can also be used without this increasing the construction size of the valve.

This object is achieved by a valve for use in a coolant flow and comprising: a valve housing with at least one inlet and at least one outlet; a valve body rotatably received in the valve body such that coolant flow between the inlet and outlet varies depending on the rotary position of the valve body; an actuator having an actuator shaft for rotating the valve body; and a fail-safe mechanism which can be pretensioned rotationally. The valve body is in rotational engagement with a coupling element via which the valve body is releaseably connected indirectly to the actuator shaft. In the event of a fault, the valve body can be decoupled from the actuator shaft by an axial movement of the coupling element. As such, the fail-safe mechanism comes into rotational engagement with the coupling element as a result of the axial movement of the coupling element and rotates the valve body to a predefined fail-safe position.

In particular, the object is achieved in that the valve body is in engagement with an axially movable coupling element, via which the valve body is releasably connected indirectly to the actuator shaft, wherein in the event of a fault i.e. if the coolant temperature exceeds a predefined temperature for any reason whatsoever, the valve body is decoupled from the actuator shaft by an axial movement of the coupling element, while the fail-safe mechanism comes into rotational engagement with the coupling element as a result of the axial movement of the coupling element, whereby the valve body is rotated to a predefined fail-safe position in which the coolant flow through the valve is preferably maximal.

Because the valve body is decoupled from the actuator shaft in the event of a fault, the fail-safe mechanism in the event of the fault need not work against the resistance of the positioning actuator; rather the fail-safe mechanism must merely be able to rotate the valve body, for which no particularly stiff torsion spring is required. In addition, because of the decoupling of the actuator shaft from the valve body, self-locking positioning actuators may also be used without a particularly stiff torsion spring being required to overcome the self-locking of the actuator; rather because of the decoupling of the actuator shaft from the valve body, in the event of a fault, the self-locking effect of the positioning actuator need not be overcome, so that in this respect too no particularly stiff and hence large torsion springs are required for the fail-safe mechanism.

Because the fail-safe mechanism does not act on the valve body directly but indirectly via the coupling element, it is furthermore possible to configure the fail-safe mechanism as a modular interchangeable unit which is not integrated in the valve body. Since the spring therefore need not extend completely through the valve body, the spring length can be reduced, which is equivalent to increasing the spring constant, so that weaker springs with smaller radial dimensions may be used to achieve a desired return moment.

Preferred embodiments of the invention are now presented below. Further embodiments may arise from the dependent claims, the description of the figures and the drawings.

According to one embodiment, it is provided that the coupling element has a cylinder portion, in the outer periphery of which at least one groove is formed which extends in the peripheral direction of the cylinder portion and in which a carrier of the fail-safe mechanism engages, via which firstly the fail-safe mechanism can be pretensioned and secondly, in the event of a fault, the valve body can be rotated to its predefined fail-safe position, wherein the groove is limited in the peripheral direction at a first end by a pretension stop and at a second end by a further stop. Preferably here, two grooves are formed in the cylinder portion which are offset to each other in the axial and in the peripheral direction, wherein a carrier engages in each of these grooves. Since the carrier or carriers engage in the at least one peripheral groove of the coupling element, the axial movement of the coupling element is transmitted in the desired fashion to the fail-safe mechanism, whereby this is triggered and comes into rotational engagement with the coupling element.

The length of the at least one groove defined by the two stops here predefines the working range of the valve, which may be approximately 360° if the pretension stop lies in the immediate vicinity of the further stop. For structural reasons however, the pretension stop and the further stop are offset to each other in the peripheral direction by a specific, structurally-induced dimension, so that with the valve according to the invention, working ranges of slightly less than 360° can be achieved. In a preferred practical embodiment, the two stops concerned lie so far apart that the at least one groove has an arc length in the peripheral direction which corresponds to an arc angle of around 345°. With the valve according to the invention therefore, working ranges of up to around 345° or even slightly more can be achieved. In contrast, the valve described in DE 10 2012 208 652 B3 has a working range of just 180° and is thus limited in its possible applications to uses in which such a working range is sufficient.

In comparison, the configuration with two grooves offset to each other axially and in the peripheral direction has proved advantageous in that, compared with an embodiment with just a single groove, any asymmetric load states which could under certain circumstances lead to a tilting of the coupling element, are thus countered. In addition, in the event of a fault, in the case of two grooves which are preferably offset to each other in the peripheral direction by 180°, the return moment is distributed evenly onto the two pretension stops of the two grooves which the associated carriers meet in the event of a fault, whereby the material stresses within the coupling element can be kept low.

In order to be able to trigger the fail-safe mechanism in the event of a fault by the axial movement of the coupling element, according to a further embodiment a temperature-sensitive actuating element is provided in the form for example of a wax element which, in the event of a fault, as a result of an axially temperature-induced deformation, causes the axial movement of the coupling element, for which it rests preferably firstly on the actuator shaft and secondly on the coupling element which receives or carries the actuating element. To provoke the axial movement of the coupling element therefore, no activation mechanism to be controlled separately is required, since the actuating element itself detects an undesirable temperature rise and automatically expands accordingly to achieve the axial movement of the coupling element. The axial movement of the coupling element provoked in this way is then transmitted to the fail-safe mechanism via the carriers engaging in the at least one peripheral groove of the coupling element, whereby the fail-safe mechanism is triggered and comes into rotational engagement with the coupling element.

In order to be able to transfer the fail-safe mechanism into its pretensioned state by rotation of the actuator shaft via the coupling element which is releasably connected to the actuator shaft, the coupling element is turned by rotation of the actuator shaft in a direction which allows the respective pretension stop at the first end of the respective groove to come into engagement with or impact on the associated carrier of the fail-safe mechanism. As a result, on a continued rotational movement, the fail-safe mechanism or its torsion spring is pretensioned and hence "tightened" to a certain extent. To be able to lock the fail-safe mechanism in this pretensioned state until a fault occurs, the fail-safe mechanism has at least one engagement cam extending in the axial direction, which in pretensioned state locks the fail-safe mechanism against a housing cover extending in the radial direction. Preferably, two engagement cams are provided which are offset to each other in the radial and in the peripheral direction, wherein the offset in the peripheral direction is preferably 180° in order to avoid asymmetric load states.

According to a simple embodiment, the at least one engagement cam—as in the valve described in DE 10 2012 208 652 B3—may engage in a recess in the housing cover; however according to a preferred embodiment, it is proposed that at least one arcuate ramp portion is provided on the inside of the housing cover which extends in the peripheral direction and forms an abutment, against which the at least one engagement cam of the fail-safe mechanism is pretensioned and locked in its pretensioned state. For load symmetry reasons, here again, according to a preferred embodiment, it is provided that two ramp portions are provided which are offset to each other in the radial and in the peripheral direction and which are each assigned to one the preferably two engagement cams. Here again, the offset in the peripheral direction is preferably 180° in order to avoid asymmetric load states.

In contrast to the valve described in DE 10 2012 208 652 B3, the abutment is formed not by recesses in the housing cover but by ramp portions formed thereon, wherein it has proved particularly advantageous if either a single ramp portion is provided or several, preferably two ramp portions offset to each other in the radial direction, since in this case a reset range with a rotary angle of almost 360° can be achieved by the fail-safe mechanism in the event of a fault, which is similar to the working range of the valve in normal operating state. If the fail-safe mechanism is triggered, the respective engagement cam, after being released from the abutment of the respective ramp, can cover an arc length which corresponds to an arc angle of 360° until it again comes to lie behind the respective ramp. This also applies in the case of two ramps arranged radially offset to each other, since in this case, because of the radial offset of the ramp portions, the abutment of the one ramp does not obstruct the engagement cam assigned to the other ramp portion.

According to a further embodiment, the at least one engagement cam is formed on a radially extending disc of the fail-safe mechanism which is arranged axially moveably on the coupling element. Because of the axial mobility, the engagement cams can ride up and slide along the ramps when the fail-safe mechanism is pretensioned by rotation of the actuator shaft. The disc may enclose, in the manner of a collar, one end of a sleeve surrounding the coupling element, forming a socket, on the inner periphery of which the above-mentioned carriers are formed. Thus the carriers and the engagement cams are directly coupled together functionally, so that the axial movement of the coupling element can be transmitted to the engagement cams via the carriers engaging in the grooves for triggering the fail-safe mechanism.

According to yet another embodiment, it is provided that the fail-safe mechanism (in particular said disc) is rotationally pretensioned by a torsion spring, wherein this torsion spring also serves to press or pretension the disc in the axial direction against the housing cover.

Since during tightening or pretensioning of the fail-safe mechanism, the carriers are in contact with the pretension stop of the respective groove of the coupling element, and the disc with the engagement cams deflects in a first axial direction when the engagement cams slide up along the associated ramps on pretensioning of the fail-safe mechanism, according to a further embodiment it is provided that the at least one groove of the coupling element has a widening in the region of its first end which widens in this first axial direction. In this way, the respective carrier may deflect inside the respective groove in an axial direction if, during tightening of the fail-safe mechanism, the disc is deflected in the axial direction following the incline of the ramps.

The above-mentioned widening at the first end of the respective groove may also be widened in the second axial direction opposite the first axial direction. The widening in the second axial direction here serves to prevent a seizing of the fail-safe mechanism after its triggering by the temperature-sensitive actuation element, the axial temperature-induced deformation of which, in the event of a fault, causes the axial movement of the coupling element. If the fail-safe mechanism has been triggered by the temperature-sensitive actuating element, this may deform further in the axial direction on a further temperature rise, which after triggering of the fail-safe mechanism may lead to the coupling element being clamped against the fail-safe mechanism by friction. In order to compensate for this undesirable excessive movement of the temperature-sensitive actuating element, therefore the above-mentioned widening is also widened in the second axial direction, so that the carriers of the fail-safe mechanism can come to lie in this region without risk of function loss if the axial movement of the coupling element persists after the triggering of the fail-safe mechanism.

As already mentioned above, the coupling element is axially movable and is in rotational engagement with the valve body. According to a further embodiment, this coupling is achieved in that the valve body has a substantially hollow-cylindrical form, wherein a beaker portion is connected rotationally fixedly to the valve body in its interior, receives a coupling portion of the coupling element sliding in the axial direction and is in rotational engagement therewith, which can be achieved for example by a notched toothing or other form-fit connection active in the peripheral direction only.

Preferably, the beaker portion has at least one passage opening in its peripheral wall so that through this, this coolant can reach the immediate vicinity of the temperature-sensitive actuating element which is carried by the coupling element. In this way, it can be ensured that the temperature-sensitive actuating element can react without delay to undesirable temperature rises of the coolant, in order to be able to trigger the fail-safe mechanism as quickly as possible.

Finally, with regard to the drive connection between the coupling element and the actuator shaft, it is preferred if the coupling element is firstly connected by a form-fit engagement of an out-of-round element (e.g. a shaft flange) in a complementarily formed recess, and secondly releasably connected to the actuator shaft, wherein the form-fit engagement can be released as a result of said axial movement of the coupling element.

Further areas of applicability will become apparent from the detailed written description provided herein. The description and specific examples provided in this summary section are intended for purposes of illustration only and are not intended to limit the scope of the present disclosure.

DRAWINGS

The drawings described herein are for illustrative purposes only of selected embodiments and not all implementations and are not intended to limit the present disclosure to only that actually shown. With this in mind, various features and advantages of example embodiments of the present disclosure will become apparent from the written description when considered in combination with the appended drawings, wherein:

FIG. 1 shows a longitudinal section through a valve according to the invention according to one exemplary embodiment;

FIG. 2a, b show a perspective section view and a cross-section of the valve body of the valve in FIG. 1;

DETAILED DESCRIPTION

Figure 1:
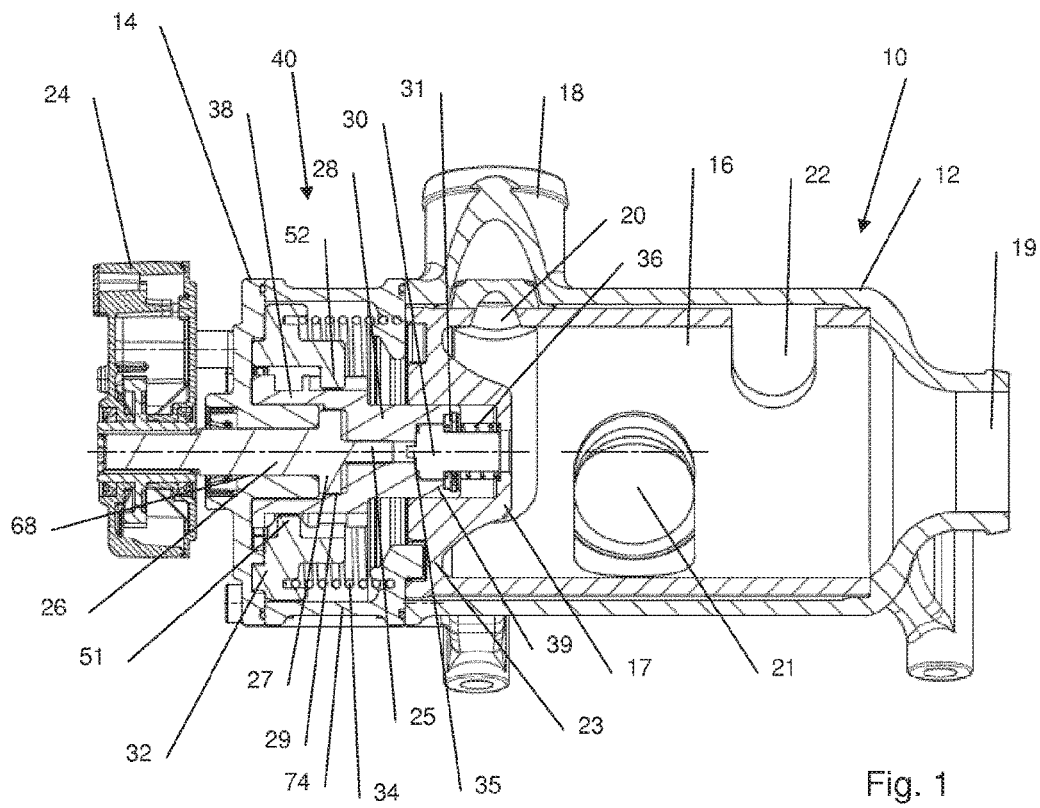

According to FIG. 1, the valve 10 has a substantially hollow-cylindrical housing portion 12 with an outlet 19 and a plurality of inlets 18, of which however only one can be seen. In its interior, the valve housing 12 rotatably receives an also substantially hollow-cylindrical valve body 16, wherein this valve body 16 has a plurality of inlet passages 20, 21, 22 which are aligned with an associated inlet 18 depending on the rotary position of the valve body 16, whereby a coolant flow between the respective inlet 18 and the outlet 19 can be varied according to the rotary position of the valve body 16.

Furthermore, the valve 10 has a positioning actuator 24, the shaft 26 of which is releasably connected indirectly to the valve body 16 for rotation thereof. The actuator shaft 26 here extends through an opening 68 of a housing cover 14 which is arranged on a substantially hollow-cylindrical housing body 74, which receives the fail-safe mechanism 40 of the valve 10 and which in turn is releasably mounted on the valve housing 12. Instead of the fail-safe mechanism 40 being accommodated in a separate housing body 74, the valve housing 12 may also be configured correspondingly longer in order to be able to receive the fail-safe mechanism 40 without an additional housing body being required. Accommodation of the fail-safe mechanism 40 in a housing body 74 which can be mounted releasably on the valve housing 12 has however proved advantageous in that, in this way, the valve 10 can also be operated without the fail-safe mechanism, for which a corresponding housing cover would be fitted directly to the valve housing 12 (modular structure).

Figures 3A, 3B, 3C:
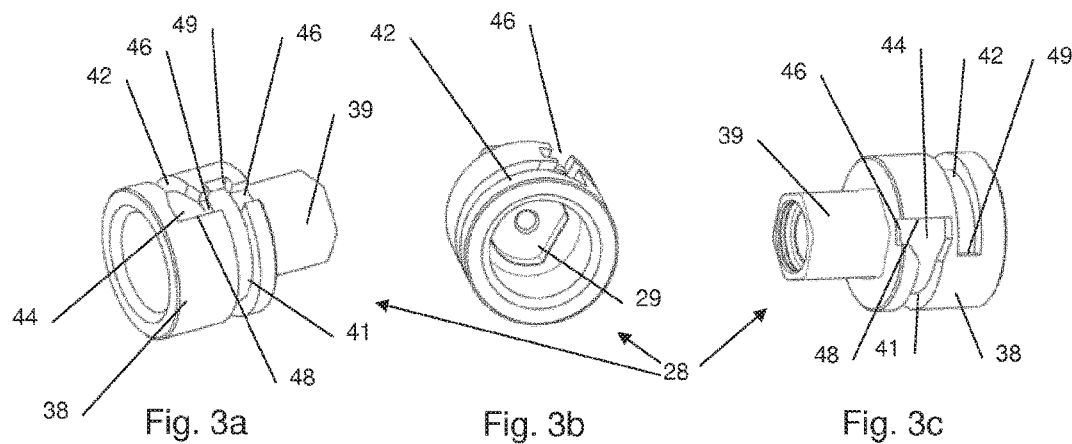
FIGS. 3a-3c show perspective depictions of the coupling element of the valve in FIG. 1.

As can furthermore be seen from FIG. 1, the valve 10 furthermore has a sleeve-like coupling element 28 which is shown in detail in different perspectives on FIGS. 3a-3c. The sleeve-like coupling element 28 has a cylindrical portion 38 and a coupling portion 39, which is here formed hexagonal and engages sliding in a beaker portion 17 which is connected rotationally fixedly to the valve body 16 via a plurality of spoke portions 23 in the interior of the valve body 16. For this, the beaker portion 17 has an inner hexagonal form corresponding or complementary to the form of the outer hexagon 39 of the coupling element 28, so that the coupling element 28 can be received by the beaker portion 17 sliding in the axial direction and is permanently in rotational engagement therewith. Thus the valve body 16 can be rotated by the coupling element 28.

The rotation of the coupling element 28 is here provoked by the positioning actuator 24 and transmitted to the coupling element 28 via its shaft 26, for which the actuator shaft 26 is surrounded collar-like by a shaft flange 27 flattened on two sides, which fits into a complementarily formed recess 29 inside the coupling element 28, see FIG. 3b. The actuator shaft 28 is thus connected releasably by form-fit to the coupling element 28 via a double flat in the form of the shaft flange 27 flattened on two sides. During normal fault-free operation of the valve 10, the valve body 16 is thus coupled to the actuator shaft 26 via the coupling element 28, so that the coolant flow between inlet 18 and outlet 19 can be varied as desired by means of the positioning actuator 24.

The design of the fail-safe mechanism 40 which is accommodated in the housing body 74 will now be discussed. The fail-safe mechanism 40 comprises amongst others a socket, here designated the disc 32, which is shown in detail in different perspectives in FIGS. 4a-4c. The disc 32 has an axially extending sleeve portion 54, see in particular FIG. 4b. The disc 32 thus surrounds the coupling element 28, wherein it engages with carriers 51, 52 formed on the inner periphery of the sleeve portion 54 and protruding radially inwards, in respective grooves 41, 42 formed in the outer periphery of the cylinder portion 38 of the coupling element 28 and extending in the peripheral direction of the cylinder portion 38, see FIGS. 3a-3c. Both the two carriers 51, 52 and the two grooves 41, 42 are offset to each other in both the axial and in the peripheral directions, wherein the offset in the peripheral direction is preferably 180° in order to avoid asymmetric load states.

Thus with a fixed disc 32, during normal operation the coupling element 28 can be turned freely between a first position in which the two carriers 51, 52 stop on a first end 48 of the two grooves 41, 42, formed as a pretension stop, and a second position in which the two carriers 51, 52 stop on a second end 49 of the two grooves 41, 42, formed as a further stop 49, opposite the first end 48. This means that in normal operating state, the working range of the valve 10 is predefined by the length of the two grooves 41, 42 in the peripheral direction.

Although the grooves 41, 42 in the embodiment shown extend only over an arc length which corresponds to an angle of around 200°, the grooves 41, 42 may however also extend over an arc length which corresponds to an arc angle of approximately 360°, for example around 345°, so that in normal operating state the valve body 16 has a working range of almost 360°.

During the normal operating state of the valve 10, the disc 32 of the fail-safe mechanism 40 is locked on the housing cover 14. For this, the disc 32 has two engagement cams 56 offset to each other in the peripheral direction by preferably 180° and protruding in the axial direction from the underside of the disc 32 (see FIG. 4c). In normal operating state of the valve 10, the engagement cams 56 are pretensioned, by means of a torsion spring 34 of the fail-safe mechanism 40, against the axially parallel flanks of two abutments 66. In the pretension direction of the torsion spring 34, the abutments 66 transform into two arcuate ramp portions 61, 62 which are formed on the inside of the housing cover 14, offset to each other in both the peripheral direction and in the radial direction, wherein here again the offset in the peripheral direction is preferably 180° (see FIG. 6).

In this way, in the normal operating state of the valve 10, the disc 32 of the fail-safe mechanism 40 is secured in its starting position on the housing cover 14 and does not therefore influence the function of the valve 10. In other words, the coupling element 28 can rotate freely relative to the fixed disc 32, wherein the carriers 51, 52 of the disc 32 slide along the grooves 41, 42 of the coupling element 28. The positioning actuator 24 need not here work against the torsion spring 34.

If however, for example, the control of the valve 10 is defective, the positioning actuator 14 is defective or the valve 10 sticks, an incorrect position of the valve 10 may result and hence an undesirable temperature rise of the coolant which flows through the at least one inlet 18 into the valve 10. In this case, the fail-safe mechanism 40, and in particular the rotationally pretensioned disc 32, leads to the valve body 16 being rotated into a predefined fail-safe position, in which the coolant flow through the valve 10 is preferably maximal in order to counter undesirable overheating states in the cooling circuit.

To be able to trigger the fail-safe mechanism 40, in the interior of the valve body 16, a temperature-sensitive actuating element 30 is provided in the form for example of a wax element which is received by the hexagonal coupling portion 39 of the coupling element 28, wherein this is secured by means of a circlip 31. The temperature-sensitive actuating element 30 here extends into the beaker portion 17 of the valve body 16 which has at least one passage opening 76 in its side wall (see FIG. 2). Through this passage opening 76, the coolant can penetrate directly as far as the temperature-sensitive actuating element 30, so that this can trigger the fail-safe mechanism 40 with minimal delay.

A carrier 77 for an alternative expansion element (not shown) is arranged in the passage of the valve body 16. The carrier 77 is held centrally by two webs and has two bypass elements which are arranged opposite each other, are assigned to the passage opening 76, and as recesses guide the coolant flowing through the bypass opening BPÖ directly onto the expansion element. This direct contact flow causes the expansion element to react with minimal delay (FIG. 2b).

Figure 2A:
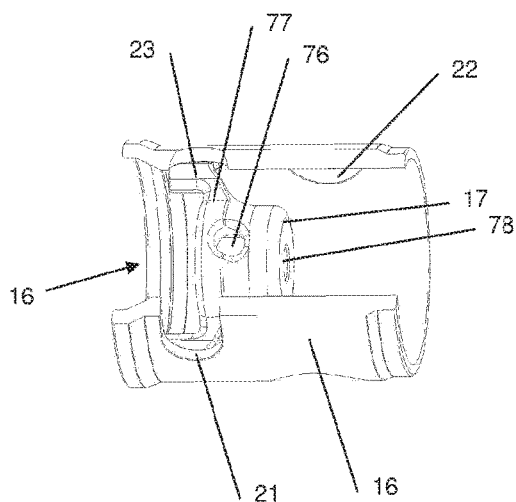
Figure 2B:
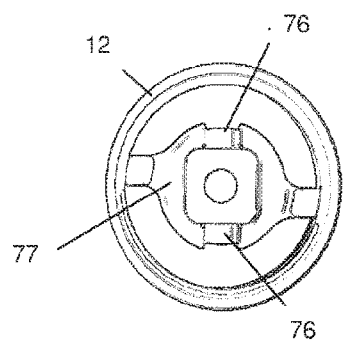

FIG. 2a shows a carrier 77 in the passage of the cylindrical valve body 16, which is provided for an expansion element (not shown). The carrier is configured pot-like in its region carrying the expansion element, wherein this region has a passage opening 76 in the form of a recess or an opening through which the coolant flowing through the inlet opening 21 is conducted directly onto the expansion element. This direct contact flow causes the expansion element to react with minimal delay. A further opening 78 is provided on the base of the pot-like region of the carrier element 77 for outflow.

If the temperature-sensitive actuating element 30 registers an unexpectedly high temperature rise of the coolant, this leads to the actuating element 30 expanding in the radial direction and, by means of an actuating pin 35, exerting a pressure force on the shaft extension 25 at the free end of the actuator shaft 26. Since, in the manner explained above, the coupling element 28 is however received rotationally fixedly but axially movably by the beaker portion 17, this leads to the coupling element 28 undergoing an axial movement in the direction of the beaker portion 17, or being deflected in the axial direction in the direction of the beaker portion 17. This in turn has the result that the valve body 16 or the coupling element 28 is decoupled from the actuator shaft 26 because of its axial movement. In particular, the double flat in the form of the shaft flange 27 flattened on two sides is released from the complementarily formed recess 29 in the interior of the coupling element 28, so that the shaft 26 and the coupling element 28 can rotate independently of each other.

Because of the fact that the two carriers 51, 52 of the disc 32 engage in the two grooves 41, 42 of the coupling element 28, the axial movement or deflection of the coupling element 28 furthermore leads to the disc 32 also undergoing an axial movement in the direction of the beaker portion 17, against the axial pressure force of the torsion spring 34 which acts on the disc 32 in addition to the abovementioned torsion force in the direction of the housing cover 14. As a result, the disc 32, in its starting position, is unlocked from the housing cover 14 since the interlock between the engagement cams 56 of the disc 32 and the abutments 66 of the housing cover 14 is released. This in turn has the consequence that, independently of the actual rotary position of the valve body 16 or coupling element 28, the carriers 51, 52 of the disc 32 are turned, because of the rotational pretension effect of the torsion spring 34, so far that they come to rest on the pretension stops 48 of the two grooves 41, 42.

As soon as this is the case, the coupling element 28 and the valve body 16 coupled rotationally fixedly thereto are rotated by the pretension effect of the torsion spring 34, transmitted via the disc 32 and in particular its carriers 51, 52, into the above-mentioned fail-safe position. In this fail-safe position, the engagement cams 56 impact on the protrusions 59 which are formed on the inside of the cover 14 and offset to each other in both the radial and in the peripheral directions. The one of these protrusions 59 is assigned to the first ramp portion 61 and is on the same peripheral track, while the other protrusion 59 is assigned to the second ramp portion 62 and is on the same peripheral track as this portion 62.

The arc length or corresponding arc angle between the respective abutment 66 and the stop 64 of the assigned protrusion 59 here corresponds to the angle of the working range of the valve 10 in the normal operating state, and hence to the arc length of the two grooves 41, 42. In this way, it can be ensured that in the event of a fault, the valve body 16 can be rotated, irrespective of its actual position, by the fail-safe mechanism 40 via the coupling element 28, into its predefined fail-safe position in which the coolant flow through the valve 10 is preferably maximal in order thus counter overheating states.

When the trigger which led to the faulty state has been eliminated, the fail-safe mechanism 40 can then be returned to its starting position in which the disc 32 is secured on the housing cover 14 (so-called pretensioning or tightening of the fail-safe mechanism). For this, the actuator shaft 26 is turned counterclockwise or to the left viewed from the actuator 24, which has the consequence that the disc 32 is also turned counterclockwise or to the left via the carriers 51, 52 lying against the two pretension stops 48. Here the engagement cams 56 ride up the ramp portions 61, 62 of the cover 14 and slide up along these, with the consequence that the disc 32 is briefly deflected in the direction of the valve body 16 against the axial pretension effect of the torsion spring 34. As soon as the engagement cams 56 pass the upper end of the ramp portions 61, 62, the disc 32 is pressed by the torsion spring 34 back in the direction of the housing cover 14, wherein in this position the engagement cams 56 again come into engagement with the abutments 66 of the ramp portions 61, 62, so that the fail-safe mechanism 40 is ready for triggering again in the event of fault.

Preferred structural details of the valve 10 are described in more detail below:

As can be seen in particular from FIGS. 3a and 3c, the two grooves 41, 42 in the region of their first end 48 each have a widened region 44 which, in the installation position according to FIG. 1, widens in the axial direction both in the direction of the valve body 16 and in the direction of the housing cover 14. The widening in the direction of the valve body 16 proves advantageous in that it allows the carriers 51, 52 engaging in the grooves 41, 42 to deflect in the axial direction inside the respective groove 41, 42 when, during tightening of the fail-safe mechanism 40, the disc 32 is deflected in the direction of the valve body 16 following the incline of the ramp portions 61, 62. In contrast, the widening in the direction of the housing cover 14 allows compensation for any excessive movement of the temperature-sensitive actuating element 30: if the fail-safe mechanism 40 has been triggered by the temperature-sensitive actuating element 30, this can continue to deform in the axial direction on a further temperature rise. After triggering of the fail-safe mechanism 40, this can lead to the coupling element 28 being clamped against the fail-safe mechanism by friction between the carriers 51, 52 and the grooves 41, 42. To prevent this, the grooves 41, 42 are therefore widened, in the region of their first end 48, in the direction of the housing cover 14, so that after triggering of the fail-safe mechanism 40, the carriers 51, 52 can come to lie in this expanded area without function loss.

As can furthermore be seen in particular from FIGS. 3a and 3c, the walls of the grooves 41, 42 have openings 46. These openings 46 serve, during assembly of the valve, to allow insertion of the carriers 51, 52 in the respective grooves 41, 42 in the manner of a bayonet closure.

Figures 4A, 4B, 4C:
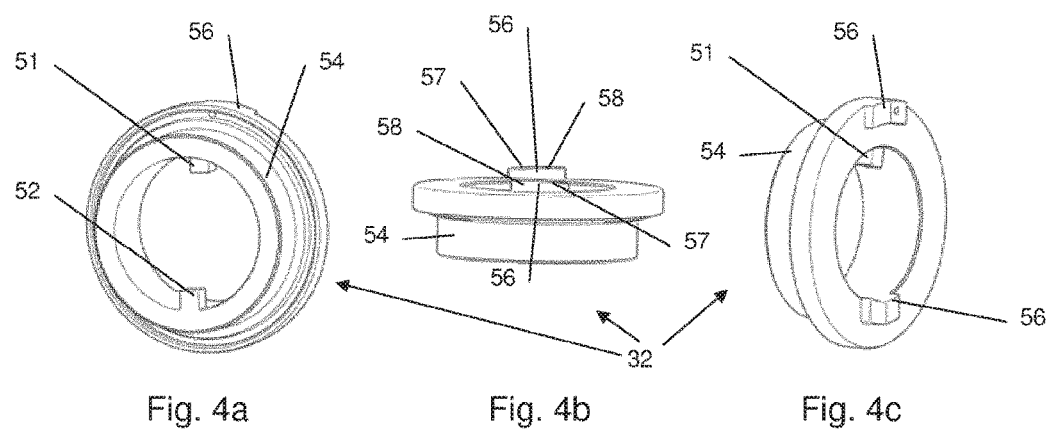
FIGS. 4a-4c show the disc of the valve in FIG. 1 in different perspective depictions.

As can be seen furthermore in particular from FIG. 4b, the two engagement cams 56 each have a ramp region 57 and a following plateau region 58. The incline of the ramp region 57 here corresponds to the incline of the associated ramp portion 61, 62 of the housing cover 14. In this way, the surface pressures between the engagement cams 56 and the ramp portions 61, 62 can be kept low, which has a positive effect not only on the wear but also on the ease of movement of the fail-safe mechanism 40.

Figures 5, 6:
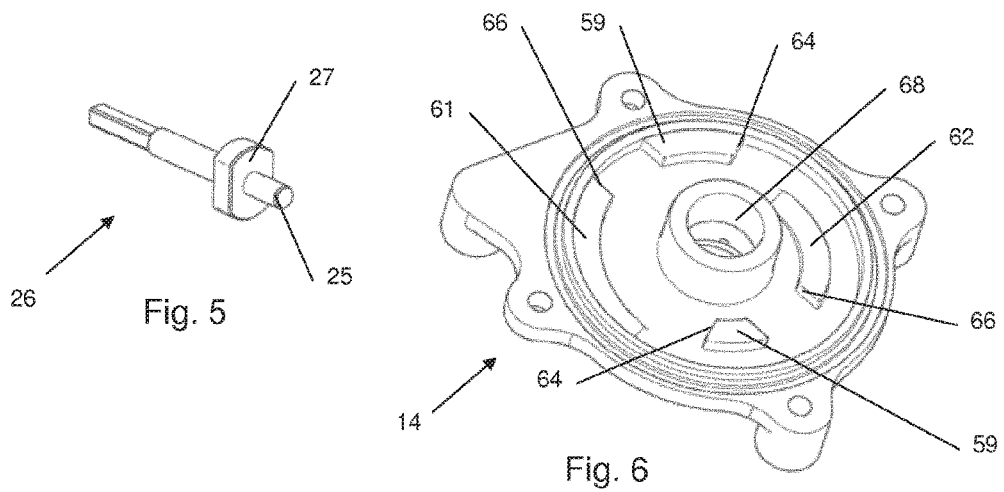
FIG. 5 shows a perspective view of the actuator shaft.
FIG. 6 is a perspective interior view of the housing cover of the valve in FIG. 1.

According to the depiction in FIG. 5, the shaft flange 27 is flattened on two opposite sides. According to a preferred embodiment however, it is provided that the shaft flange 27 is flattened on one side only and that the corresponding recess 29 in the coupling element 28 is also flattened on one side only. In this way, a rotational encoding is created between the shaft 26 and the coupling element 28, which allows the two components 26, 28 concerned to be coupled together only in one defined rotary position.

As can be furthermore gathered from FIG. 1, the valve 10 furthermore has a compression spring 36 which rests firstly on the base of the beaker portion 17 and secondly on the circlip 31, and hence pretensions the coupling element 28 in the direction of the housing cover 14. This ensures that, after triggering of the fail-safe mechanism 40 and when the temperature-sensitive actuating element 30 has contracted again due to cooling, the recess 29 of the coupling element 28 again comes into form-fit engagement with the shaft flange 27 in order to create a new rotationally fixed connection between the actuator shaft 26 and the coupling element 28, and thus allow a tightening of the fail-safe mechanism 40 on the next positioning movement of the actuator shaft 26. Furthermore, the grooves 41, 42 are aligned with the respective carriers 51, 52 since the disc 32 is pressed back by the torsion spring 34 against the housing cover 14 after completion of the pretension process of the fail-safe mechanism 40. Thus as part of the pretension process of the fail-safe mechanism 40 (when the engagement cams 56 of the disc 32 slide along the ramp portions 61, 62 of the cover 14), the coupling element 28 can be deflected in the direction of the valve body 16 due to friction via the carriers 51, 52 of the disc 32. Since, after completion of the pretension process however, the friction between the carriers 51, 52 and the pretension stops 48 has been eliminated because of the locking of the disc 32 on the housing cover 14, after completion of the pretension process the coupling element 28 would stick in its position deflected in the direction of the valve body 16. To counter this, the coupling element 28 is therefore pretensioned by means of said spring 36 in the direction of the housing cover 14, in order thus to ensure a correct alignment between the carriers 51, 52 and the grooves 41, 42 for the normal operating state.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

LIST OF REFERENCE NUMERALS

10 Valve
12 Valve housing
14 Housing cover on 74
16 Valve body in 12
17 Beaker portion of and in 16
18 Inlet in 12
19 Outlet in 12
20 Inlet passage in 16
21 Inlet passage in 16
22 Inlet passage in 16
23 Spoke portions between 16 and 17
24 Actuator
25 Shaft extension
26 Actuator shaft
27 Shaft flange
28 Coupling element
29 Recess in 28
30 Actuator element
31 Circlip
32 Disc, socket
34 Torsion spring in 745
35 Actuating pin on 30
36 Compression spring in 17
38 Cylinder portion of 28
39 Hexagonal portion, coupling portion of 28
40 Fail-safe mechanism
41 Groove in 38
42 Groove in 38
44 Widening in 48
46 Opening
48 First end, pretension stop of 41, 42
49 Second end, pretension stop of 41, 42
51 First carrier
52 Second carrier
54 Sleeve portion on 32
56 Engagement cam on 32
57 Ramp region of 56
58 Plateau region of 56
59 Protrusion on 14
61 First ramp portion on 14
62 Second ramp portion on 14
64 Stops of 59
66 Abutment
68 Opening in 14
74 Housing body on 12
76 Passage opening in 17
77 Carrier
78 Outflow opening

The invention claimed is:

1. A valve for use in a coolant flow, comprising:
a valve housing with at least one inlet and at least one outlet;
a valve body which is received rotatably by the valve housing, wherein the coolant flow between the inlet and outlet varies depending on the rotary position of the valve body;
an actuator with a shaft for rotating the valve body; and
a fail-safe mechanism which can be pretensioned rotationally;
wherein the valve body is in rotational engagement with an axially moveable coupling element via which the valve body is releasably connected indirectly to the actuator shaft, wherein in the event of a fault, the valve body can be decoupled from the actuator shaft by an axial movement of the coupling element, wherein the fail-safe mechanism is adapted to come into rotational engagement with the coupling element as a result of the axial movement of the coupling element in order to rotate the valve body to a predefined fail-safe position, wherein the coupling element has a cylinder portion, in the outer periphery of which at least one groove is formed which extends in the peripheral direction of the cylinder portion and in which a carrier of the fail-safe mechanism engages and which is limited in the peripheral direction at a first end by a pretension stop and at a second end by a further stop, and wherein two grooves are formed in the cylinder portion which are offset to each other in the axial and in the peripheral direction and in each of which a carrier engages.

2. The valve as claimed in claim 1, wherein the at least one groove has a length in the peripheral direction which corresponds to an arc angle of less than 360° and is preferably around 345°.

3. The valve as claimed in claim 1, wherein the at least one groove has at its first end a widening which widens in the axial direction.

4. The valve as claimed in claim 1, wherein a temperature-sensitive actuating element is provided which, in the event of a fault, as a result of an axially temperature-induced deformation, causes the axial movement of the coupling element, for which it rests on the actuator shaft.

5. The valve as claimed in claim 1, wherein the fail-safe mechanism has at least one engagement cam extending in the axial direction, which in a pretensioned state locks the fail-safe mechanism against a housing cover extending in the radial direction, wherein two engagement cams are provided which are offset to each other in the radial and in the peripheral direction.

6. The valve as claimed in claim 5, wherein at least one ramp portion is provided on the inside of the housing cover which extends in the peripheral direction and forms an abutment, against which the at least one engagement cam of the fail-safe mechanism is pretensioned and locked in its pretensioned state, wherein two ramp portions are provided which are offset to each other in the radial and in the peripheral direction and which are each assigned to one of the two engagement cams.

7. The valve as claimed in claim 6, wherein at least one engagement cam is formed on a radially extending disc of the fail-safe mechanism which is axially moveable.

8. The valve as claimed in claim 7, wherein the fail-safe mechanism is rotationally pretensioned by a torsion spring which presses the disc in the axial direction against the housing cover.

9. The valve as claimed in claim 1, wherein the valve body has a substantially hollow-cylindrical form, wherein a beaker portion is connected rotationally fixedly to the valve body in its interior, receives a coupling portion of the coupling element sliding in the axial direction and is in rotational engagement therewith, wherein at least one passage opening for the coolant flow is formed in a side wall of the beaker portion.

10. The valve as claimed in claim 1, wherein the coupling element is releasably connected to the actuator shaft by a form-fit engagement, wherein the form-fit engagement is released as a result of the axial movement of the coupling element.

11. The valve as claimed in claim 1, wherein the valve body which is mounted in the valve housing has openings in its outer periphery for controlling a flow of coolant through channels in the valve housing, and comprises a temperature-reacting expansion element mounted in the opening on a pot-like carrier, wherein at least one bypass element assigned to the passage opening is arranged in the carrier.

12. A valve for use in a coolant flow, comprising:
a valve housing with at least one inlet and at least one outlet;
a valve body which is received rotatably by the valve housing, wherein the coolant flow between the inlet and outlet varies depending on the rotary position of the valve body;
an actuator with a shaft for rotating the valve body; and
a fail-safe mechanism which can be pretensioned rotationally;
wherein the valve body is in rotational engagement with an axially moveable coupling element via which the valve body is releasably connected indirectly to the actuator shaft, wherein in the event of a fault, the valve body can be decoupled from the actuator shaft by an axial movement of the coupling element, wherein the fail-safe mechanism is adapted to come into rotational engagement with the coupling element as a result of the axial movement of the coupling element in order to rotate the valve body to a predefined fail-safe position, wherein the coupling element has a cylinder portion, in the outer periphery of which at least one groove is formed which extends in the peripheral direction of the cylinder portion and in which a carrier of the fail-safe mechanism engages and which is limited in the peripheral direction at a first end by a pretension stop and at a second end by a further stop, wherein two grooves are formed in the cylinder portion which are offset to each other in the axial and in the peripheral direction and in each of which the carrier engages, wherein the fail-safe mechanism has at least one engagement cam extending in the axial direction, which in a pretensioned state locks the fail-safe mechanism against a housing cover extending in the radial direction and, wherein two engagement cams are provided which are offset to each other in the radial and in the peripheral direction.

13. The valve as claimed in claim 12, wherein at least one ramp portion is provided on the inside of the housing cover which extends in the peripheral direction and forms an abutment, against which the at least one engagement cam of the fail-safe mechanism is pretensioned and locked in its pretensioned state, wherein two ramp portions are provided which are offset to each other in the radial and in the peripheral direction and which are each assigned to one of the two engagement cams.

14. The valve as claimed in claim 13, wherein at least one engagement cam is formed on a radially extending disc of the fail-safe mechanism which is axially moveable.

15. The valve as claimed in claim 14, wherein the fail-safe mechanism is rotationally pretensioned by a torsion spring which presses the disc in the axial direction against the housing cover.

16. The valve as claimed in claim 12, wherein the valve body has a substantially hollow-cylindrical form, wherein a beaker portion is connected rotationally fixedly to the valve body in its interior and receives a coupling portion of the coupling element sliding in the axial direction and which is in rotational engagement therewith, and wherein at least one passage opening for the coolant flow is formed in a side wall of the beaker portion.

17. The valve as claimed in claim 12, wherein the coupling element is releasably connected to the actuator shaft by a form-fit engagement, and wherein the form-fit engagement is released as a result of the axial movement of the coupling element.

18. The valve as claimed in claim 12, wherein the valve body is mounted in the valve housing and has openings in its outer periphery for controlling a flow of coolant through channels in the valve housing, and comprises a temperature-reacting expansion element mounted in the opening on a pot-like carrier, and wherein at least one bypass element assigned to the passage opening is arranged in the carrier.

19. The valve as claimed in claim 12, wherein a temperature-sensitive actuating element is provided which, in the event of a fault, as a result of an axially temperature-induced deformation, causes the axial movement of the coupling element for which it rests on the actuator shaft.

* * * * *